United States Patent [19]

Mizelle

[11] 4,186,960
[45] Feb. 5, 1980

[54] CONVERTIBLE VEHICLE SEAT
[75] Inventor: Ned W. Mizelle, Lexington, Ky.
[73] Assignee: Hoover Universal, Inc., Saline, Mich.
[21] Appl. No.: 921,316
[22] Filed: Jul. 3, 1978
[51] Int. Cl.² .................... A47C 13/00; F16M 13/00; B60N 1/10
[52] U.S. Cl. ..................................... 297/63; 248/430; 296/69; 297/65
[58] Field of Search .................. 248/429, 430; 297/64, 297/63, 65, 66, 318, 63, 64; 5/37 R; 296/65 R, 69

[56] References Cited

U.S. PATENT DOCUMENTS

| | | | |
|---|---|---|---|
| 1,668,167 | 5/1928 | McKinna | 297/65 |
| 3,011,581 | 12/1961 | Wood | 296/65 R |
| 3,350,046 | 10/1967 | Kirk | 248/430 |
| 3,394,417 | 7/1968 | O'Link | 297/65 X |
| 3,572,817 | 3/1971 | Colautti et al. | 296/65 R |
| 3,598,981 | 8/1971 | Koziol | 297/64 |
| 3,874,724 | 4/1975 | Re' | 297/318 X |
| 3,887,229 | 6/1975 | Plume | 297/65 |
| 3,913,152 | 10/1975 | Quackenbusch | 5/37 R |
| 3,964,785 | 6/1976 | Plume | 297/64 |
| 4,001,901 | 1/1977 | Quackenbusch | 5/37 R |
| 4,085,962 | 4/1978 | Wahls | 297/65 X |
| 4,099,768 | 7/1978 | Amos | 5/37 R |

FOREIGN PATENT DOCUMENTS 1580600  12/1970  Fed. Rep. of Germany ........ 296/65 R Primary Examiner—James T. McCall
Attorney, Agent, or Firm—Olsen and Stephenson

[57] ABSTRACT

A vehicle seat assembly having seat and back members pivotally connected to each other and movably mounted on a frame for movement between a seat-defining position in which the seat member is generally horizontal and the back member is upright and a bed-defining position in which the members are in general horizontal side-by-side positions. The seat member is slidably mounted on the frame by a pair of track portions that enable the horizontal reciprocal movement of the seat member between a rearward location in the seat defining position of the vehicle seat assembly and a forward location in the bed defining position of the vehicle seat assembly. A link member connects the rear member with the frame so that in response to forward movement of the seat member, the link member serves to pivot the back member rearwardly and downwardly to the horizontal position. When the seat member is moved rearwardly to its rearward location, the link member operates to pivot the back member upwardly and forwardly to the upright position.

19 Claims, 9 Drawing Figures

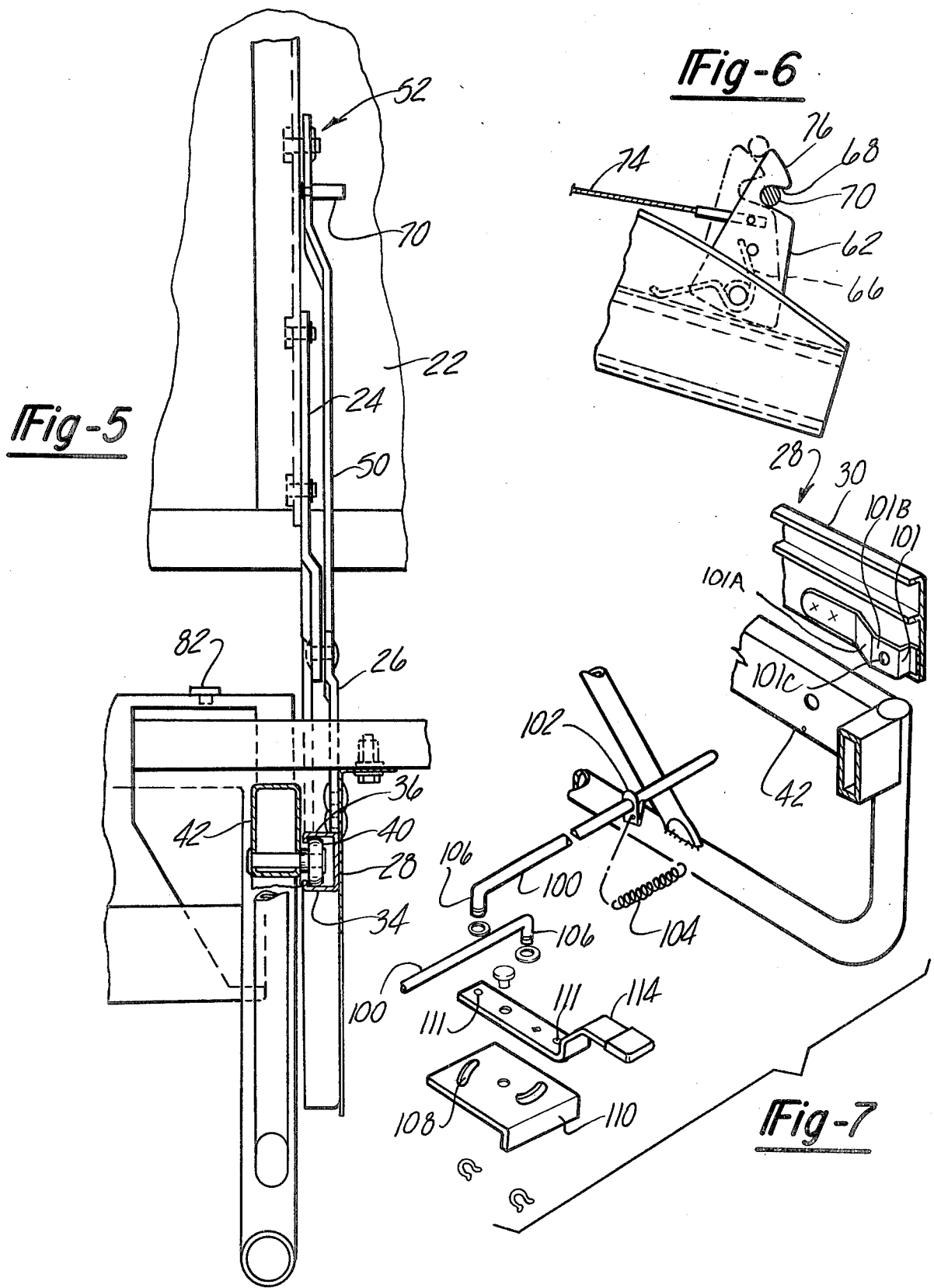

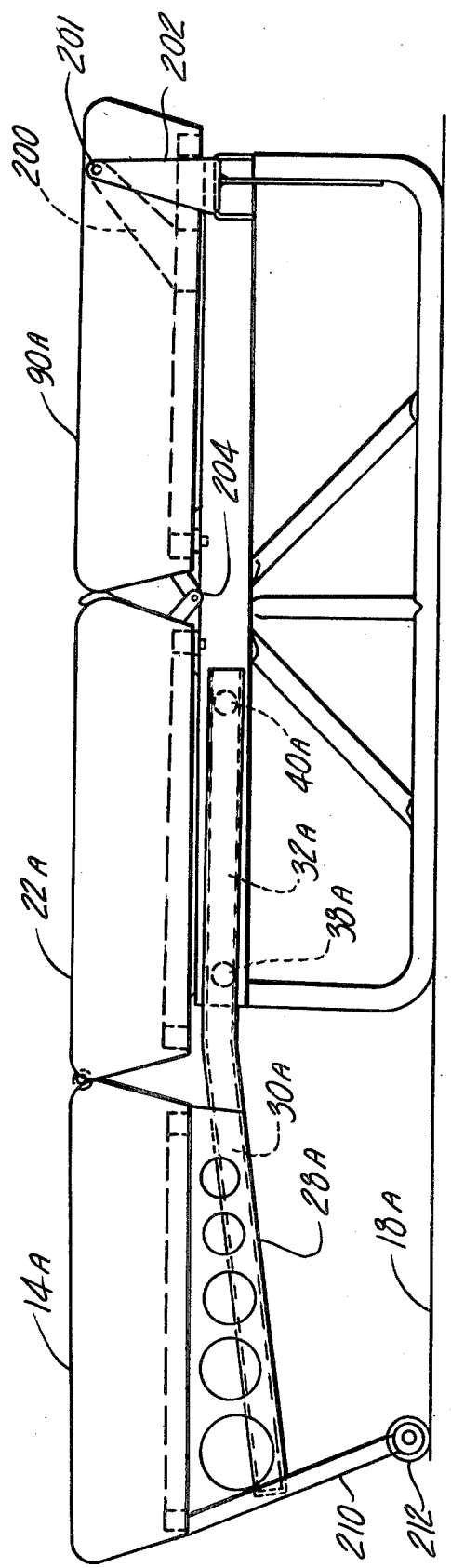

CONVERTIBLE VEHICLE SEAT

BACKGROUND OF THE INVENTION

The present invention relates generally to vehicle seats, and more particularly, to a vehicle seat that is convertible to a bed. With the increased popularity of vans, there has developed a need for a convertible van seat that operates both as a conventional seat and as a bed when it is collapsed. Since most conventional seat cushions have rearwardly inclined support surfaces, it is important that the seat member be properly oriented to position the seat support surface in a horizontal plane to provide the optimum bed support for the user. It is also essential that the seat be constructed of relatively few components that provide the proper support in both the seat-forming and bed-forming positions.

It is the object of the present invention, therefore, to provide a convertible van seat that can be moved to both seat-forming and bed-forming positions.

SUMMARY OF THE INVENTION

In accordance with the present invention, a convertible vehicle seat assembly, particularly suited for use in a van, is disclosed comprising a seat member and a back member mounted at the rear end of the seat member for pivotal movement between a seat-defining position in which the seat member is generally horizontal and the back member is upright and a bed-defining position in which the members are in side-by-side horizontal positions. The seat member, having parallel side rail members, is carried by a frame. Rollers, affixed to the frame, support the rail members on the frame for reciprocal longitudinal movement on the frame. A link member is pivotally connected at one end to the back member and is pivotally connected at the other end to a fixed location on the frame below and rearwardly of the connection of the link to the back member. When the seat member is moved forwardly from its seat defining position, it carries the back member forwardly so that the link member acts to pivot the back member downwardly and rearwardly to the bed-defining position. Suitable locking means is provided on one of the rails and the link member to maintain the vehicle seat assembly in its bed-defining position. Spring means is provided biasing the link member in such a manner so as to urge the back member to its upright position. Consequently, when the lock means is released while the seat assembly is in the bed-defining position, the spring means acts through the link member to urge the vehicle seat assembly to its seat-defining position.

In the seat defining position, a seat lock mechanism on the frame engages the rail members to maintain the vehicle seat assembly in its seat defining position. An auxiliary cushion member is permanently mounted on the frame at a position rearwardly of the back member. Movement of the seat and back members to the bed-defining position locates the back member in substantial horizontal alignment with the auxiliary support member so that a three-cushion bed is provided to accommodate a user of normal height. The frame of the vehicle seat assembly is open so that a storage space is provided beneath the seat for receiving baggage or other articles.

In another embodiment of the vehicle seat assembly, the auxiliary support member is pivotally connected to the frame and to the back member so that when the seat member is moved forwardly, the back and auxiliary members unfold to form the bed-defining position of the vehicle seat assembly. In this embodiment, additional support is provided for the vehicle seat in its extended position by means of a brace member that engages the floor of the vehicle when the seat member has been moved to its forward location.

Further objects, features, and advantages of the present invention will become apparent from a consideration of the following description when taken in connection with the appended claims and the accompanying drawing in which:

FIG. 5 is a partial elevational view of the vehicle seat assembly taken substantially from line 5—5 in FIG. 3;

FIG. 6 is an enlarged fragmentary elevational view of the locking means for maintaining the vehicle seat assembly in its bed-defining position;

FIG. 7 is an exploded perspective view of a seat-locking mechanism for maintaining the vehicle seat assembly in its seat-defining position;

FIG. 9 is a side elevational view of the vehicle seat assembly shown in FIG. 8 in which it is disposed in its bed-defining position.

Figure 1:
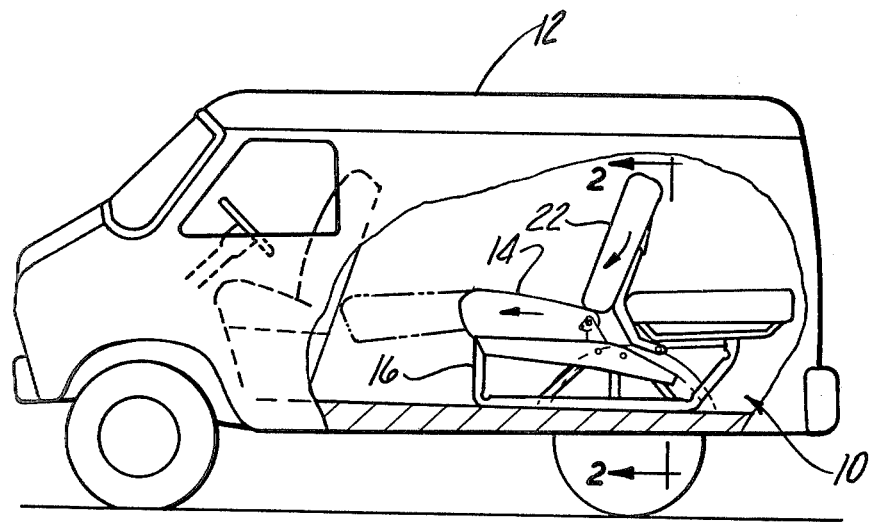
FIG. 1 is an elevational diagrammatic view of a van with portions broken away in which the convertible vehicle seat assembly of the present invention is disposed.

Referring to the drawing, the vehicle seat assembly of the present invention, indicated generally at 10 in FIG. 1, is shown disposed within a vehicle such as the van 12. The vehicle seat assembly 10 is movable between a seat-defining position shown in FIGS. 1 and 3 and a bed-defining position shown in FIG. 4. The vehicle seat assembly 10 is particularly adapted for positioning in the rear portion of the van so that when extended to the bed-defining position, the entire length of the vehicle seat assembly 10 is available for use by the occupant.

With particular reference to FIGS. 2-7, the vehicle seat assembly 10 comprises a seat member 14 that is generally horizontally disposed on a frame structure 16 that is in turn suitably mounted on the floor 18 of the van 12. The seat member 14 has a support surface 20 that is inclined slightly downwardly from the forward end of the seat 14 toward its rearward end to provide the occupant with the optimum support when he is seated on the seat member 14. A back member 22 is pivotally connected at is lower end to the rear end of the seat member 14 by means of a connecting link 24 and a connecting plate 26 (FIGS. 3 and 4) to which the link 24 is pivotally connected at the pivot point 25. The back member 22 is therefore pivotal with respect to the seat member 14.

Figure 3:
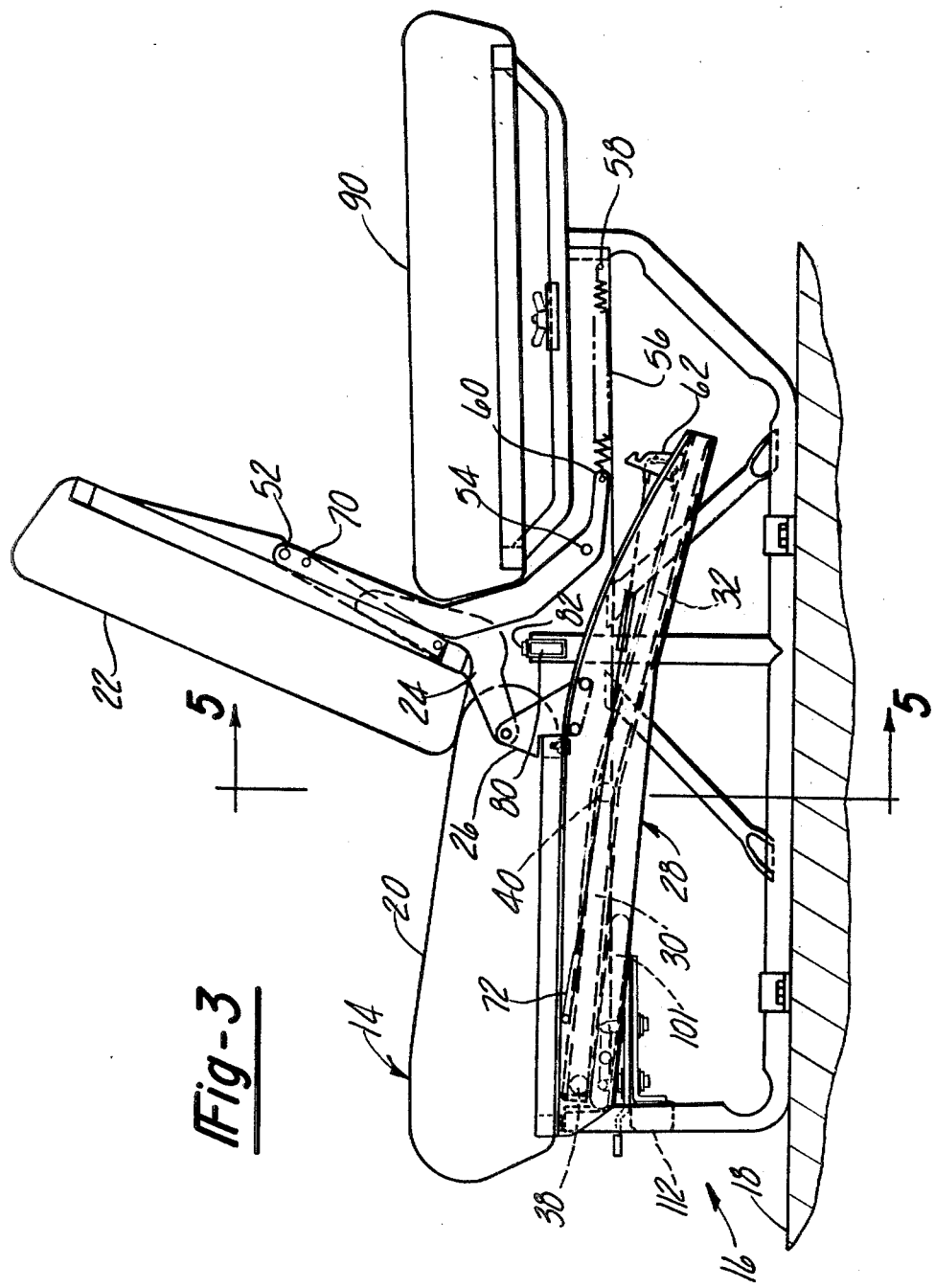
FIG. 3 is a side elevational view of the vehicle seat assembly shown in FIG. 1 showing the vehicle seat assembly in its seat defining position.

Track means is provided in the form of a pair of transversely displaced parallel rail members 28 that are fixedly mounted on the seat member 14. Each rail member 28 has a pair of generally straight track portions 30 and 32. As best seen in FIG. 5, the track portions 30 and 32 are formed to a generally C-shaped configuration (FIG. 5) having legs 34 and 36 that straddle roller members 38 and 40 that are mounted in longitudinally spaced positions on the frame member 42 of the frame 16. The rail members 28 operate to provide for the reciprocal movement of the seat member between its rearward position shown in FIG. 3 in the seat-defining position of the vehicle seat assembly and a forward location, shown in FIG. 4, in the bed-defining position of the vehicle seat assembly. The track portion 32 is inclined downwardly with respect to the track portion 30 as shown in FIG. 3 so that when the seat member 14 is moved toward its forward location, the rail members 28 cooperate with the rollers 38 and 40 to slightly elevate the rear portion of the seat member 14 so that its support surface 20 is in general horizontal alignment with the support surface of the back member 22. In this regard, the front portion of the seat member 14 may be lowered slightly to attain the desired horizontal orientation of the surface 20 of the seat member 14.

Figure 4:
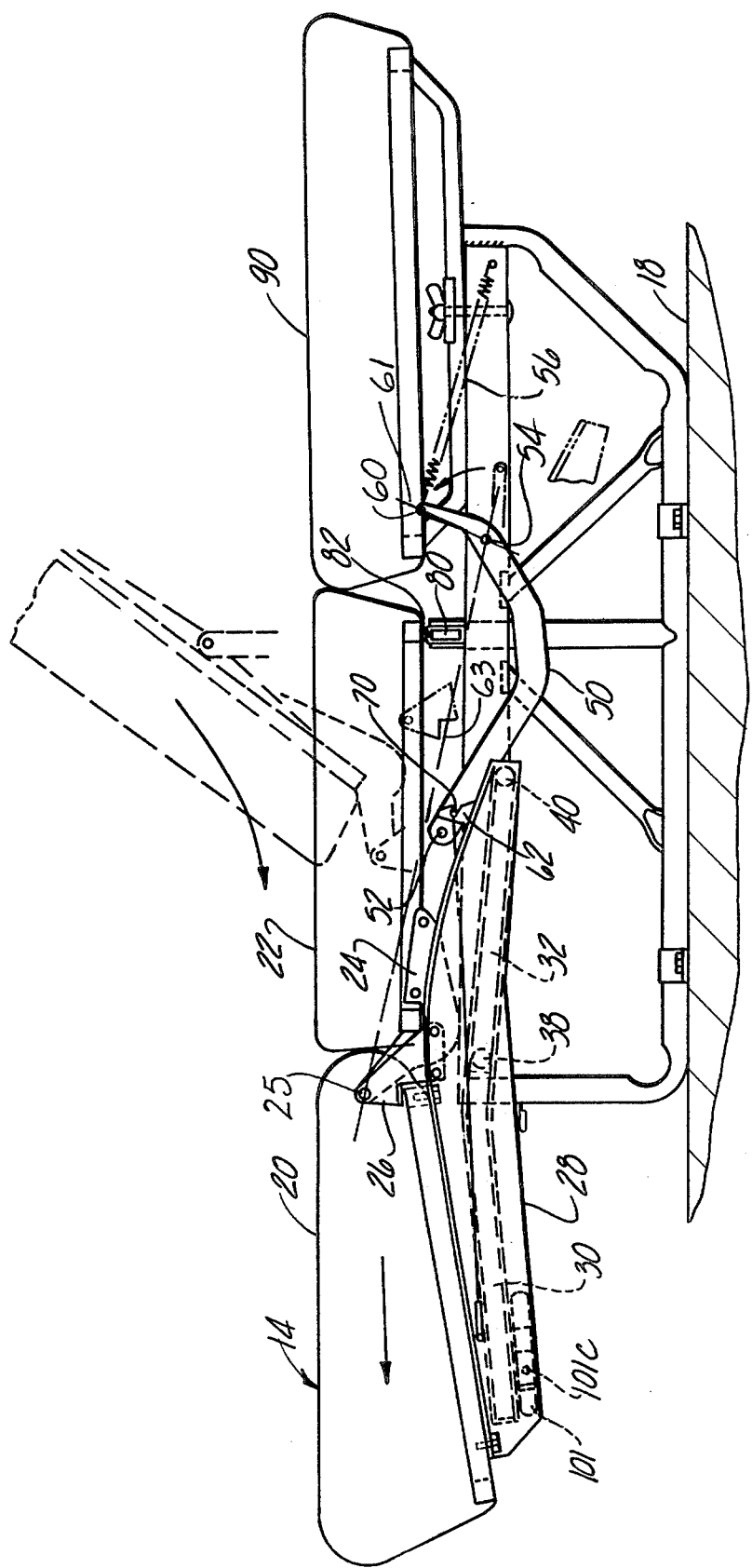
FIG. 4 is a side elevational view showing the vehicle seat assembly positioned in its bed-defining position.

A link member 50 is pivotally connected at one pivot 52 to the back member 22 and is pivotally connected at another pivot 54 on the frame 16 at a fixed location rearwardly of the back member 22. The connecting link member 50 cooperates with the seat member 14 and the back member 22 to pivot the back member 22 downwardly and rearwardly in response to the forward movement of the seat member 14 to its forward location. Biasing means in the form of a tension spring 56 is connected to the frame 16 at the connection point 58 and to the end 60 of the link member 52 and functions to effect a clockwise pivoting action of the link member 50 about the pivot 54 to thereby urge the back member 22 toward its upright position. Thus, as seen in FIG. 4, with the vehicle seat assembly 10 in the bed-defining position, the spring 56 is placed in greater tension than in the seat-defining position and urges the back member 22 upwardly. This construction facilitates the positioning of the vehicle seat assembly 10 to its seat-defining position.

Lock means is provided to maintain the vehicle seat assembly in its seat and bed-forming positions. As seen in FIGS. 3, 4, and 6, a lock plate 62 is pivotally mounted on one of the rail members 28 and is urged clockwise by the spring 66. The lock plate 62 has a pocket 68 which receives a lock pin 70 that is mounted on the link member 50. A handle 72 and a cable 74 enable the lock plate 62 to be pivoted counterclockwise against the urging of the spring 66. As the back member 22 is pivoted downwardly to its horizontal position, the pin member 70 rides on the inclined cam surface 76 of the lock plate 62, as shown in broken lines in FIG. 6, causing the lock plate 62 to be pivoted counterclockwise. Under the urging of the spring 66, the lock plate returns to its normal position when the lock pin 70 is aligned with the pocket 68 when the back member 22 is in its horizontal position. Consequently, the vehicle seat assembly 10 is maintained in its bed defining position. Movement of the lock plate counterclockwise through actuation of the handle 72 releases the lock pin 70 and enables the seat member 14 and back member 22 to be moved to the seat defining position.

An intermediate support member 80 having an adjustable stop 82 is located to engage the top back end of the back member 22 in its horizontal position to provide additional support for the vehicle seat assembly 10 in its bed-defining position.

An auxiliary support member 90 is detachably mounted on the frame 16 in a position in which the back member 22 is in general horizontal alignment with the auxiliary support member 90 in the bed-defining position 10 to provide a bed construction having a length suitable to accommodate the height of an average-size person.

Figure 2:
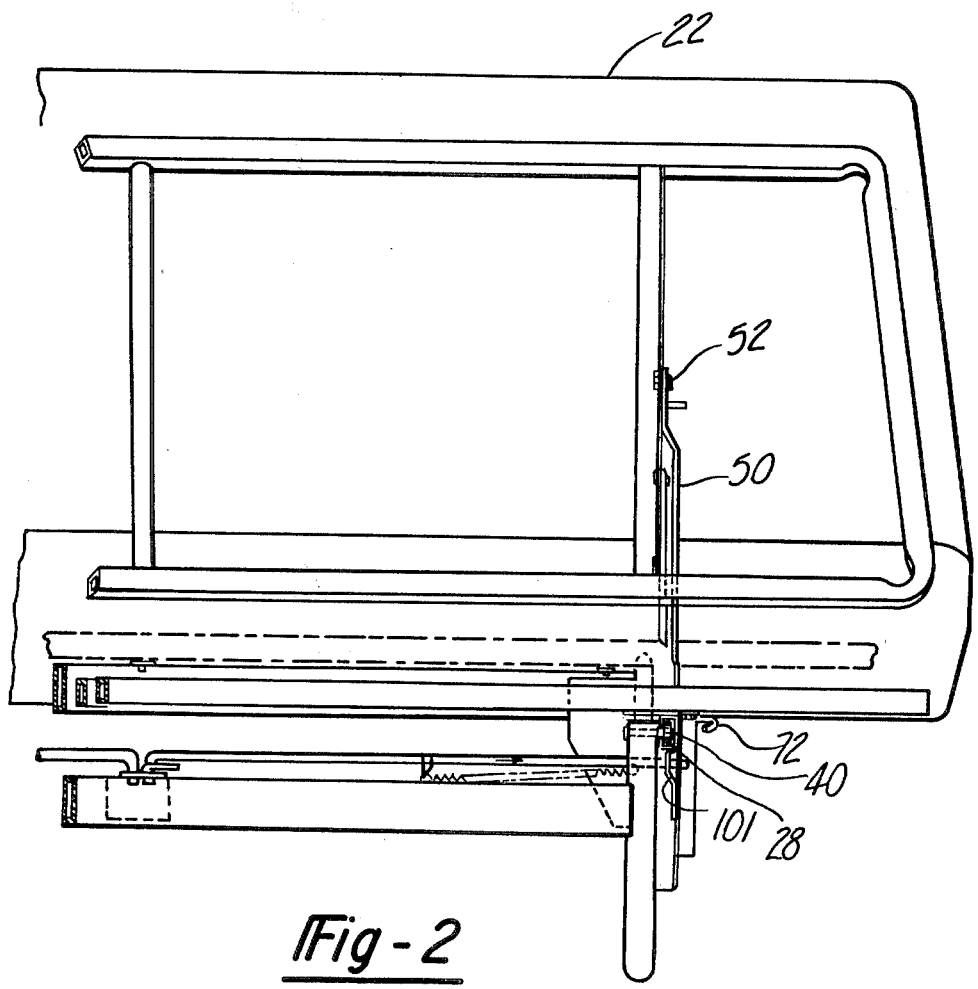
FIG. 2 is an elevational view in fragmentary of the vehicle seat assembly taken substantially from line 2—2 of FIG. 1.

The lock means further includes a seat-locking mechanism for maintaining the vehicle seat assembly 10 in the seat defining position and is best illustrated in FIGS. 2, 3, and 7. The seat lock mechanism comprises a pair of lock members 100 in the form of rod members that are transversely movable through the frame members 42 and into engagement with the rail members 28. One of the rods 100 carries a clip 102 to which a tension spring 104 is attached. The tension spring 104 is also connected to the frame member 42 to urge the rod members 100 toward the rail member 28. The rods 100 have offset portions 106 that extend through curved openings or slots 108 that are diametrically spaced apart in a plate 110 that is mounted on the cross frame member 112 (FIG. 3). Thus, the spring 104 acts through the rod 100 to which it is connected and the plate 110 to urge the other rod member 100 away from the truss or rail member 28. The plate 110 with its curved openings 108 define a guide means for controlling the movement of the rod members 100. An operating member 114 is pivotally connected to the lock plate 110 on its upper surface, and on opposite sides of the pivotal connection of the handle 114 to the plate 110 openings 111, formed in the handle 114, receive the offset portions 106 of the rod members 100 so that pivotal movement of the handle 114 effects transverse displacement of the rods 100.

A pair of striker members 101 (one shown in FIGS. 3 and 7) are secured on the insides of the rail members 28 and function to engage the rod members 100 in the seat defining positions of the seat assembly 10 maintaining the seat assembly 10 in the seat defining position. Each striker 101 has a cam surface 101A that extends inwardly toward the seat assembly 10 and forwardly with the rail 28 terminating at a flat portion 101B that is provided with an opening 101C. The flat portion 101B is therefore displaced inwardly from the rail member 28 so that the rods 100 must be moved inwardly before advancing into the holes 101C. Pivotal movement of the actuating member 114 withdraws the rod members 100 from engagement with the strikers 101 thereby enabling the seat assembly 10 to be moved forwardly from the seat defining position toward the bed-defining position.

In the bed-defining position of the seat assembly 10, the strikers 101 are located forwardly of the rods 100. Movement of the seat 14 rearwardly towards the seat defining position of the seat assembly 10 carries the strikers 101 rearwardly. As this movement proceeds, the cam surfaces 101A of the strikers 101 engage the rods 100 pushing them inwardly against the biasing action of the spring 104. When the openings 101C in the flat portions 101B of the strikers 101 are aligned with the rods 100, the seat assembly 10 is in its seat-defining position. The rods 100, through the urging of the spring 104, are moved into the openings 101C locking the seat assembly in the seat-defining position. Thus, the seat-locking mechanism ensures that the seat assembly 10 is automatically locked in the seat-defining position.

As seen in FIG. 3, when the seat assembly 10 is locked in the seat-defining position, the spring 56 is in substantial alignment with the pivot 54 on the link or toggle member 50 thereby exerting essentially no turning forces on the link 50. The seat assembly 10 can be moved to the bed-defining position, shown in FIG. 4, by first releasing the seat-locking mechanism which locks the seat assembly 10 in the seat-defining position and then moving the seat member 14 forwardly from the rearward location (FIG. 3). This forward movement of the seat member 14 carries the back member 22 forwardly resulting in its being pivoted clockwise relative to the pivot point 25 by virtue of the line 50 being pivotally connected at 52 to the back member 22 and at 54 to the seat frame 16. Thus, the link member 50 pivots counterclockwise about the pivot 54 moving the link member end 60 counterclockwise about the pivot 54 and stretching the spring 56. In the bed-defining position, the pulling force exerted on the link member 50 by the spring 56 is generally perpendicular with respect to a line 61 passing through the pivot 54 and the end 60 of the link member 50 so that in the FIG. 4 position of the link member 50, the spring 56 exerts the maximum pulling force on the link member 50 tending to rotate the link clockwise.

The forward movement of the seat member 14 is capable of pivoting the back member 22 to a nearly horizontal position in which the pivot 52 is above an imaginary line 63 extending between point 25 and pivot 54. The final movement of the back member 22 to its horizontal position is accomplished by applying a downward force to the back member 22 which moves the pivot 52 to a position below the line 63 and engages the lock pin 70 on the link member 50 in the lock plate 62 thereby locking the seat assembly 10 in the bed-defining position.

In the bed-defining position, the link member 50 is described as being in a toggle position because the pivot 52 is disposed below the line 63. As noted above, in the toggle position of the link 50, the link member 50 and the spring 56 cooperate to provide the maximum lifting force on the back member 22.

When the lock plate 62 is pivoted to release the lock pin 70, the link member 50 is pivoted clockwise about the pivot 54 by the spring 56 to elevate the back member 22 to a clearance relationship with the auxiliary cushion 90 thereby enabling the rearward movement of the seat member 14 from its forward location.

Figure 8:
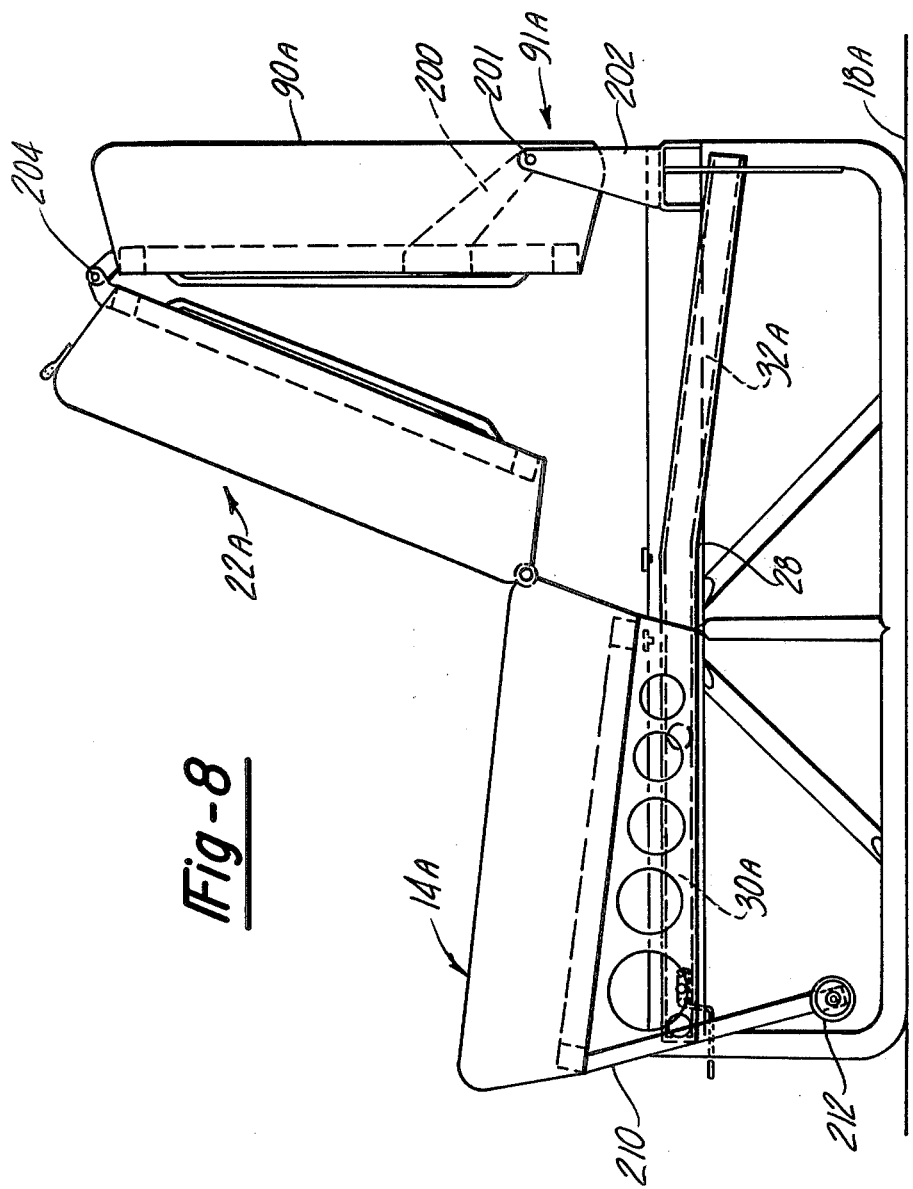
FIG. 8 is a side elevational view of a modified embodiment of the vehicle seat assembly of the present invention shown in the seat-defining position.

A modified vehicle seat assembly 10A is illustrated in FIGS. 8 and 9 comprising a seat member 14A, and a back member 22A, pivotally connected at its lower end to the rear end of the seat member 14A so as to be carried by the seat member 14A. An auxiliary support member 90A is pivotally connected at its rear end 91A to the frame 16A by means of connecting members 200 and 202, and is connected at a junction point 204 on the back member 22A. The seat member 14A carries transversely-displaced rail members 28A having U-shaped channel track portions 30A and 32A constructed in a manner similar to the rail members 28 of the vehicle seat assembly 10. A support brace 210 is mounted on the seat member 14A and has a roller 212 that engages in the van floor 18A in the bed-defining position and is elevated above the floor 18 in the seat-defining position.

In the seat-defining position of the vehicle seat assembly 10A, the seat member 14A is generally horizontal with its seat support surface 20A being slightly inclined rearwardly, and the back member 22A is generally upright with the auxiliary support member 90A also being generally upright with its support surface facing in the rearward direction. Like the vehicle seat assembly 10, the vehicle seat assembly 10A is provided with a lock mechanism for maintaining the vehicle seat assembly in its seat-defining position, although it is not shown in FIGS. 8 and 9.

Movement of the seat 14A forwardly causes the back seat member 20A to pivot downwardly and rearwardly and move forwardly as it is carried by the seat member 14A. This causes the auxiliary support member 90A to be pivoted counterclockwise about the pivot point 201 downwardly and forwardly to a position in which it is horizontal with respect to the back seat member 22A which in turn is horizontal with respect to the seat member 14A. The angled track portions 30A and 32A elevate the rear portion of the seat member 14A and lower the front portion of the seat member 14A so that its support surface is in horizontal alignment with the surfaces of the members 22A and 90A and the roller 212 engages the floor 18A. Thus, the vehicle seat assembly 10A unfolds from its seat-defining position to its bed-defining position. Reverse operation of the members 14A, 22A, and 90A from the arrangement shown in FIG. 9 to the seat-defining position shown in FIG. 8 is accomplished by grasping the upper portion of the rear member 22A in an upward lifting movement while simultaneously moving the seat member 14A rearwardly.

From the above description, it can be seen that an improved convertible seat assembly is disclosed consisting of few components that are durable in service to easily convert the seat assembly 10 to a bed to accommodate the weary traveler. The seat provides the user with optimum comfort in both its seat-defining and bed-defining positions and by virtue of the open framework for supporting the seat 10, there is ample storage space beneath the seat that can be utilized.

What is claimed:

1. A vehicle seat assembly having a frame, a seat member having an inclined support surface and a back member movably mounted on said frame for movement between a seat-defining position in which the seat member is generally horizontal and the back member is upright and a bed-defining position in which the members are in general horizontal side-by-side positions, the back member having upper and lower ends, means pivotally supporting the back member at the lower end thereof for pivotal movement relative to the seat member, coacting track and roller means on said frame and said seat member supporting the seat member for general horizontal reciprocal movement relative to said frame between a forward location in the bed-defining position and a rearward location in the seat-defining position, said track and roller means including a least a pair of track portions and at least a pair of roller members spaced apart longitudinally of said track portions, said pair of roller members being engaged with one of said track portions in said seat-defining position and being movable therefrom into engagement with the other of said track portions in the bed-defining position of said seat assembly, said other track portion and said pair of roller members cooperating to maintain said seat member in a position in which said seat member support surface is generally horizontal, and means cooperating with the seat member to provide for the downwardly and rearwardly pivoting of the back member to its horizontal side-by-side position with the seat member in response to a forward movement of the seat member to its forward location in the bed-defining position of the vehicle seat assembly, and to provide for the upwardly and forwardly pivoting of the back member to its upright position in response to the rearward movement of the seat member to its rearward location in the seat-defining position of the vehicle seat assembly.

2. The vehicle seat assembly according to claim 1, wherein the seat member has front and rear ends, said means pivotally supporting the back member being mounted on the seat member at its rear end so that the back member is carried by the seat member.

3. The vehicle seat assembly according to claim 2 wherein said track and roller means comprises at least one rail member mounted on the seat member, said track portions being disposed on said rail member and said roller members being mounted on said frame enabling said rail member to be moved reciprocally relative to said frame to carry said seat member between said forward and rearward locations.

4. The vehicle seat assembly according to claim 1, wherein said means cooperates with the seat member to provide for the pivoting of the back member comprises a link member pivotally connected at one end to the back member, and pivotally connected at the other end thereof to a fixed location on said frame remote from the back member.

5. The vehicle seat assembly according to claim 4 further including means biasing said seat assembly toward the seat-defining position.

6. The vehicle seat assembly according to claim 5 wherein said biasing means comprises spring means connected to the link member and to a fixed location on said frame biasing the back member to its upright position in the seat defining position of the vehicle seat assembly.

7. The vehicle seat assembly according to claim 4 further including lock means operable to lock said vehicle seat assembly in the seat-defining position and the bed-defining position.

8. The vehicle seat assembly according to claim 7 wherein said lock means includes a lock plate movably mounted on said rail member, and a lock pin mounted on the link member, said lock plate engaging said lock pin to maintain the vehicle seat assembly in the bed-defining position.

9. The vehicle seat assembly according to claim 2 wherein said seat supporting surface is inclined downwardly and rearwardly toward the rear end of said seat member, said track portions being angled with respect to and in communication with each other so that in the bed-defining position of the vehicle seat assembly, the rear end of the seat member is elevated to orient the supporting surface in a generally horizontal plane.

10. The vehicle seat assembly according to claim 1 further including an auxiliary support member having a generally horizontal support surface, said support member being positioned rearwardly of said back member so as to be aligned with said back member in the bed-defining position of said vehicle seat assembly.

11. The vehicle seat assembly according to claim 7 wherein said lock means includes a lock member movable into engagement with said track and roller means to maintain the vehicle seat assembly in the seat-defining position.

12. The vehicle seat assembly according to claim 11, wherein said lock means further includes an operating member connected to said lock member and means biasing said lock member toward said track means, said operating member being operable when actuated to withdraw said lock member out of engagement with said track means.

13. The vehicle seat assembly according to claim 12 wherein said lock means further includes guide means receiving said lock member for controlling the movement of said lock member into and out of engagement with the track means.

14. The vehicle seat assembly according to claim 1 further including a support member positioned to engage the upper end of the back member in the bed-forming position of the vehicle seat assembly.

15. The vehicle seat assembly according to claim 1 further including a frame supporting said vehicle seat assembly, and an auxiliary support member pivotally connected at one end to the upper end of the back member and at the other end to the frame at a fixed location thereon rearwardly of the back member, said members being arranged so that in the seat-defining position, the auxiliary support member is in an upright position and in the bed-defining position the auxiliary support member is pivoted downwardly to a generally horizontal side-by-side position with the back member.

16. The vehicle seat assembly according to claim 15 further including secondary support means mounted on the seat member, said secondary support means being engageable with a supporting surface in the bed-defining position of the vehicle seat assembly to provide additional support for the seat member.

17. The vehicle seat assembly according to claim 12 wherein said track means includes a striker member mounted on said track and roller means for engaging said lock member in said seat defining position, said striker member having a raised portion extending in a direction toward said lock member, means forming an opening in said raised portion in which said lock member is disposed in said seat defining position, and an inclined cam portion extending rearwardly from said raised portion away from said lock member, said striker member being positioned forwardly of said lock member in said bed-defining position and movable rearwardly during movement of said seat assembly to the seat-defining position so that said cam portion engages said lock member moving it against the urging of said lock member biasing means, said lock member thereafter being urged into said opening by said lock member biasing means when said seat member is at said seat-defining position.

18. A vehicle seat assembly having a frame, a seat member, and a back member movably mounted on said frame for movement between a seat-defining position in which the seat member is generally horizontal and the back member is upright and a bed-defining position in which the members are in general horizontal side-by-side positions, means pivotally supporting the back member at the lower end thereof on said seat member, means supporting said seat member on said frame for reciprocal movement relative to said frame between a forward location in the bed-defining position and a rearward location in the seat-defining position, lock means securing said seat assembly in the bed-defining position and releasable to enable the movement of said seat assembly to the seat-defining position, link means pivotally connected to said back member and pivotally connected to said frame at a point located rearwardly of the pivotal connection to said back member in the upright position of said back member, said link means being operable to pivot said back member to said generally horizontal position in response to the forward movement of said seat member from said rearward location, said link means being moved to a toggle position in the bed-defining position of said seat assembly, and means biasing said link means from said toggle position so that when said lock means is released, said link means and said bias means cooperate to pivot said back member upwardly from said horizontal position to enable the rearward movement of said seat member from said forward location.

19. The vehicle seat assembly according to claim 18 wherein said bias means comprises a coil spring member secured at one end to said link means and at the other end to said frame, said spring member being substantially aligned with the point at which said link means is pivoted to said frame in the seat-defining position of said seat assembly so that said spring member exerts substantially no pivoting force on said link means, said spring means being to one side of said pivot point in the bed-defining position of said seat assembly so as to exert substantial pivoting force on said link means.

* * * * *